US010044635B2

(12) United States Patent
Eitan et al.

(10) Patent No.: US 10,044,635 B2
(45) Date of Patent: Aug. 7, 2018

(54) FRAME FORMATS FOR CHANNEL BONDING AND MIMO TRANSMISSIONS

(71) Applicant: QUALCOMM Incorporated, San Diego, CA (US)

(72) Inventors: Alecsander Petru Eitan, Haifa (IL); Amichai Sanderovich, Atlit (IL)

(73) Assignee: QUALCOMM Incorporated, San Diego, CA (US)

( * ) Notice: Subject to any disclaimer, the term of this patent is extended or adjusted under 35 U.S.C. 154(b) by 194 days.

(21) Appl. No.: 14/962,977

(22) Filed: Dec. 8, 2015

(65) Prior Publication Data

US 2016/0164800 A1 Jun. 9, 2016

Related U.S. Application Data

(60) Provisional application No. 62/089,815, filed on Dec. 9, 2014.

(51) Int. Cl.
| | |
|---|---|
| *H04L 12/927* | (2013.01) |
| *H04L 5/14* | (2006.01) |
| *H04L 27/26* | (2006.01) |
| *H04B 7/0413* | (2017.01) |
| *H04W 72/04* | (2009.01) |

(52) U.S. Cl.
CPC .......... *H04L 47/80* (2013.01); *H04B 7/0413* (2013.01); *H04L 5/14* (2013.01); *H04L 27/2602* (2013.01); *H04L 27/2613* (2013.01); *H04W 72/0446* (2013.01)

(58) Field of Classification Search
CPC . H04L 47/80; H04L 27/2613; H04L 27/2602; H04L 5/14; H04L 5/0023; H04L 5/0048; H04L 25/0226; H04L 27/3488; H04L 27/345; H04L 1/1861; H04L 1/0078; H04L 1/1692; H04L 1/004; H04B 7/0413; H04W 88/06; H04W 16/14; H04W 24/00; H04W 84/12; H04W 72/04; H04W 28/065

See application file for complete search history.

(56) References Cited

U.S. PATENT DOCUMENTS

| | | | |
|---|---|---|---|
| 2005/0141407 A1 | 6/2005 | Sandhu | |
| 2005/0190724 A1* | 9/2005 | Hansen | ................ H04L 5/0023 370/329 |
| 2011/0051705 A1* | 3/2011 | Jones, IV | ............ H04L 27/2613 370/338 |
| 2014/0211704 A1 | 7/2014 | Sampath et al. | |

OTHER PUBLICATIONS

Partial International Search Report—PCT/US2015/064768—ISA/EPO—dated Mar. 1, 2016.
International Search Report and Written Opinion—PCT/US2015/064768—ISA/EPO—dated Jun. 13, 2016.

* cited by examiner

*Primary Examiner* — Yee Lam
(74) *Attorney, Agent, or Firm* — Patterson & Sheridan, LLP

(57) ABSTRACT

Certain aspects of the present disclosure provide methods and apparatus for preamble structures for transmissions sent using channel bonding (across multiple channels) and/or MIMO (with two or more spatial streams).

9 Claims, 15 Drawing Sheets

FRAME FORMATS FOR CHANNEL BONDING AND MIMO TRANSMISSIONS

CLAIM OF PRIORITY UNDER 35 U.S.C. § 119

The present application for patent claims benefit of U.S. Provisional Patent Application Ser. No. 62/089,815, filed Dec. 9, 2014, assigned to the assignee hereof and hereby expressly incorporated by reference herein.

FIELD

Certain aspects of the present disclosure generally relate to wireless communications and, more particularly, to frame formats for transmissions using techniques such as channel bonding and multiple-input multiple-output (MIMO).

BACKGROUND

In order to address the issue of increasing bandwidth requirements demanded for wireless communications systems, different schemes are being developed to allow multiple user terminals to communicate with a single access point by sharing the channel resources while achieving high data throughputs. Multiple-input multiple-output (MIMO) technology represents one such approach that has recently emerged as a popular technique for next generation communication systems. MIMO technology has been adopted in several emerging wireless communications standards, such as the Institute of Electrical and Electronics Engineers (IEEE) 802.11 standard. The IEEE 802.11 standard denotes a set of Wireless Local Area Network (WLAN) air interface standards developed by the IEEE 802.11 committee for short-range communications (e.g., tens of meters to a few hundred meters).

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

In wireless networks with a single Access Point (AP) and multiple user stations (STAs), concurrent transmissions may occur on multiple channels toward different stations, both in the uplink and downlink direction. Many challenges are present in such systems.

SUMMARY

Certain aspects of the present disclosure provide an apparatus for wireless communications. The apparatus generally includes a processing system configured to generate a frame for transmission on a plurality of channels, the frame having first information comprising at least one of preamble, channel estimation, or header information decodable and for processing by first and second types of devices, and wherein the first information is repeated in each of the plurality of channels during transmission of the frame, second information comprising at least one of preamble, channel estimation, or header information decodable and for processing by the second type of device, and wherein the second information occupies gaps between the channels during transmission of the frame, and a portion spanning the plurality of channels and the gaps; and an interface for outputting the frame for transmission.

Certain aspects of the present disclosure provide an apparatus for wireless communications. The apparatus generally includes an interface for obtaining a frame having first information comprising at least one of preamble, channel estimation, or header information decodable and for processing by first and second types of wireless devices, the first information is repeated in each of the plurality of channels, second information comprising at least one of preamble, channel estimation, or header information decodable and for processing by the second type of device, and wherein the second information occupies gaps between the channels, and a portion spanning the plurality of channels and the gaps; and a processing system configured to process the first information and generate a channel estimate based, at least in part, on the second information, and to decode at least some of the portion of the frame based on the channel estimate.

Certain aspects of the present disclosure provide an apparatus for wireless communications. The apparatus generally includes a processing system configured to generate a frame for transmission on at least one channel, the frame having: a preamble portion comprising first information comprising at least one training field detectable by other apparatuses, the first information to be transmitted on a set of one or more sub-channels, each sub-channel comprising a fractional portion of the full bandwidth of the at least one channel, and second information comprising at least one of channel estimation or header information, the second information to be transmitted using the full bandwidth of the at least one channel, and a data portion to be transmitted using the full bandwidth of the at least one channel; and an interface for outputting the frame for transmission.

Certain aspects of the present disclosure provide an apparatus for wireless communications. The apparatus generally includes an interface for obtaining a frame having a preamble portion comprising first information comprising at least one training field detectable by other apparatuses, the first information to be transmitted on a set of one or more sub-channels, each sub-channel comprising a fractional portion of the full bandwidth of the at least one channel, and second information comprising at least one of channel estimation or header information, the second information to be transmitted using the full bandwidth of the at least one channel; and a data portion transmitted using the full bandwidth of the at least one channel; and a processing system configured to process the first information and generate a channel estimate based, at least in part, on the second information, and decode at least some of the data portion of the frame based on the channel estimate.

Certain aspects of the present disclosure provide an apparatus for wireless communications. The apparatus generally includes a processing system configured to generate a frame for transmission on at least one channel, the frame having: first information comprising at least one of a training field, channel estimation, or header information for processing by first and second types of devices, and extended header information intended for processing by only a second type of device that is a targeted recipient of the frame; and a data portion to be transmitted on the at least one channel; and an interface for outputting the frame for transmission.

Certain aspects of the present disclosure provide an apparatus for wireless communications. The apparatus generally includes an interface for obtaining a frame transmitted on at least one channel, the frame having: first information comprising at least one of a training field, channel estimation, or header information for processing by first and second types of devices, and extended header information intended for processing by only a second type of device that is a targeted recipient of the frame; and a data portion to be transmitted on the at least one channel; and a processing system configured to process the first information and decode at least some of the data portion of the frame based on the extended header information.

Aspects of the present disclosure also provide various methods, means, and computer program products corresponding to the apparatuses and operations described above.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Figure 1:
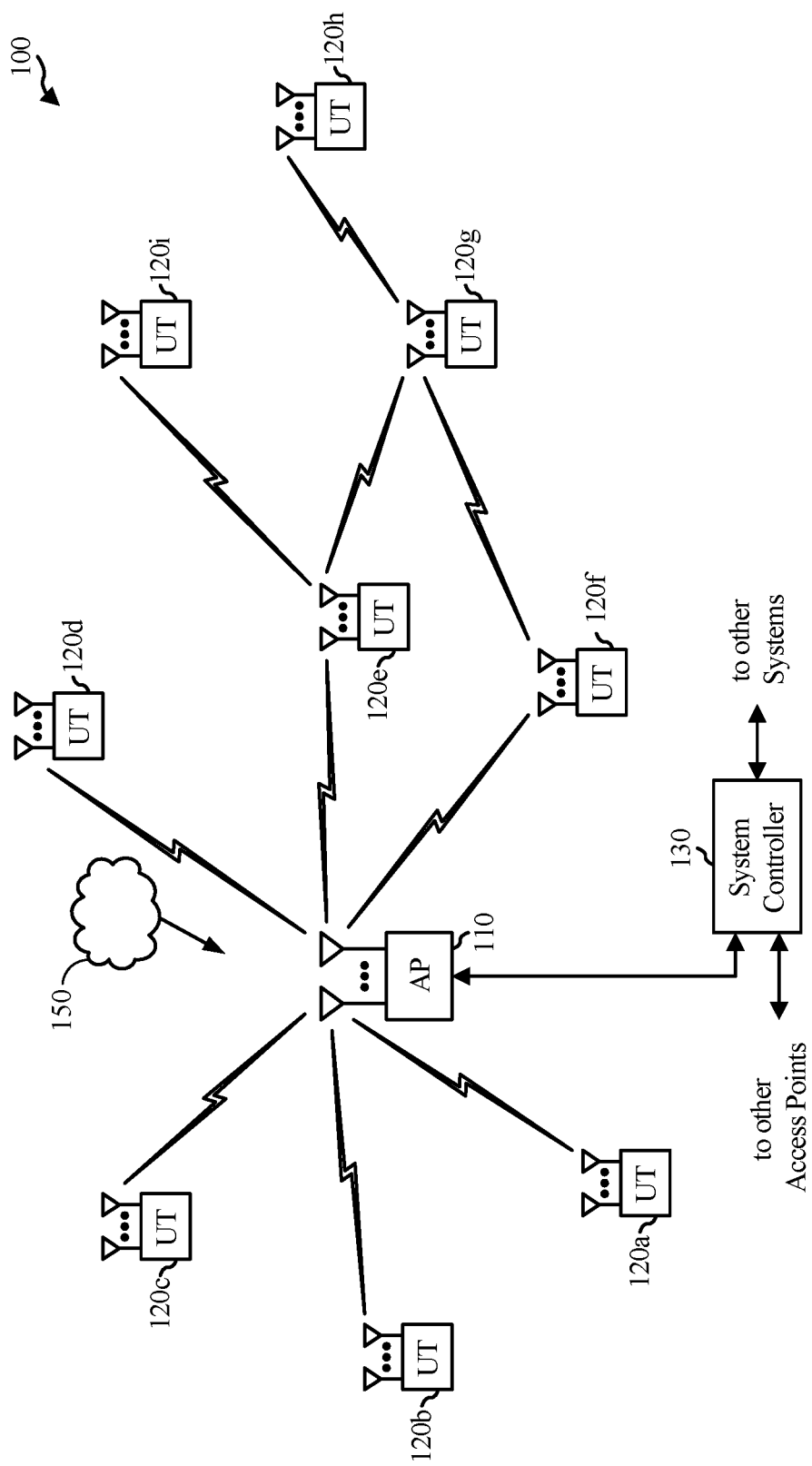
FIG. 1 is a diagram of an example wireless communications network, in accordance with certain aspects of the present disclosure.

Aspects of the present disclosure provide techniques for reducing latency in systems including legacy devices by transmitting legacy-decodable preamble information in each of multiple channels and for transmitting preamble information for channel estimation of a multi-channel transmission in gaps between the multiple channels.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as a Node B, a Radio Network Controller ("RNC"), an evolved Node B (eNB), a Base Station Controller ("BSC"), a Base Transceiver Station ("BTS"), a Base Station ("BS"), a Transceiver Function ("TF"), a Radio Router, a Radio Transceiver, a Basic Service Set ("BSS"), an Extended Service Set ("ESS"), a Radio Base Station ("RBS"), or some other terminology.

An access terminal ("AT") may comprise, be implemented as, or known as a subscriber station, a subscriber unit, a mobile station, a remote station, a remote terminal, a user terminal, a user agent, a user device, user equipment, a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

FIG. 1 illustrates a multiple-access multiple-input multiple-output (MIMO) system 100 with access points and user terminals. For simplicity, only one access point 110 is shown in FIG. 1. An access point is generally a fixed station that communicates with the user terminals and may also be referred to as a base station or some other terminology. A user terminal may be fixed or mobile and may also be referred to as a mobile station, a wireless device or some other terminology. Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

While portions of the following disclosure will describe user terminals 120 capable of communicating via Spatial Division Multiple Access (SDMA), for certain aspects, the user terminals 120 may also include some user terminals that do not support SDMA. Thus, for such aspects, an access point (AP) 110 may be configured to communicate with both SDMA and non-SDMA user terminals. This approach may conveniently allow older versions of user terminals ("legacy" stations) to remain deployed in an enterprise, extending their useful lifetime, while allowing newer SDMA user terminals to be introduced as deemed appropriate.

The system 100 employs multiple transmit and multiple receive antennas for data transmission on the downlink and uplink. The access point 110 is equipped with $N_{ap}$ antennas and represents the multiple-input (MI) for downlink transmissions and the multiple-output (MO) for uplink transmissions. A set of K selected user terminals 120 collectively represents the multiple-output for downlink transmissions and the multiple-input for uplink transmissions. For pure SDMA, it is desired to have $N_{ap} \geq K \geq 1$ if the data symbol streams for the K user terminals are not multiplexed in code, frequency or time by some means. K may be greater than $N_{ap}$ if the data symbol streams can be multiplexed using TDMA technique, different code channels with CDMA, disjoint sets of subbands with OFDM, and so on. Each selected user terminal transmits user-specific data to and/or receives user-specific data from the access point. In general, each selected user terminal may be equipped with one or multiple antennas (i.e., $N_{ut} \geq 1$). The K selected user terminals can have the same or different number of antennas.

The system 100 may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each user terminal may be equipped with a single antenna (e.g., in order to keep costs down) or multiple antennas (e.g., where the additional cost can be supported). The system 100 may also be a TDMA system if the user terminals 120 share the same frequency channel by dividing transmission/reception into different time slots, each time slot being assigned to different user terminal 120.

Figure 2:
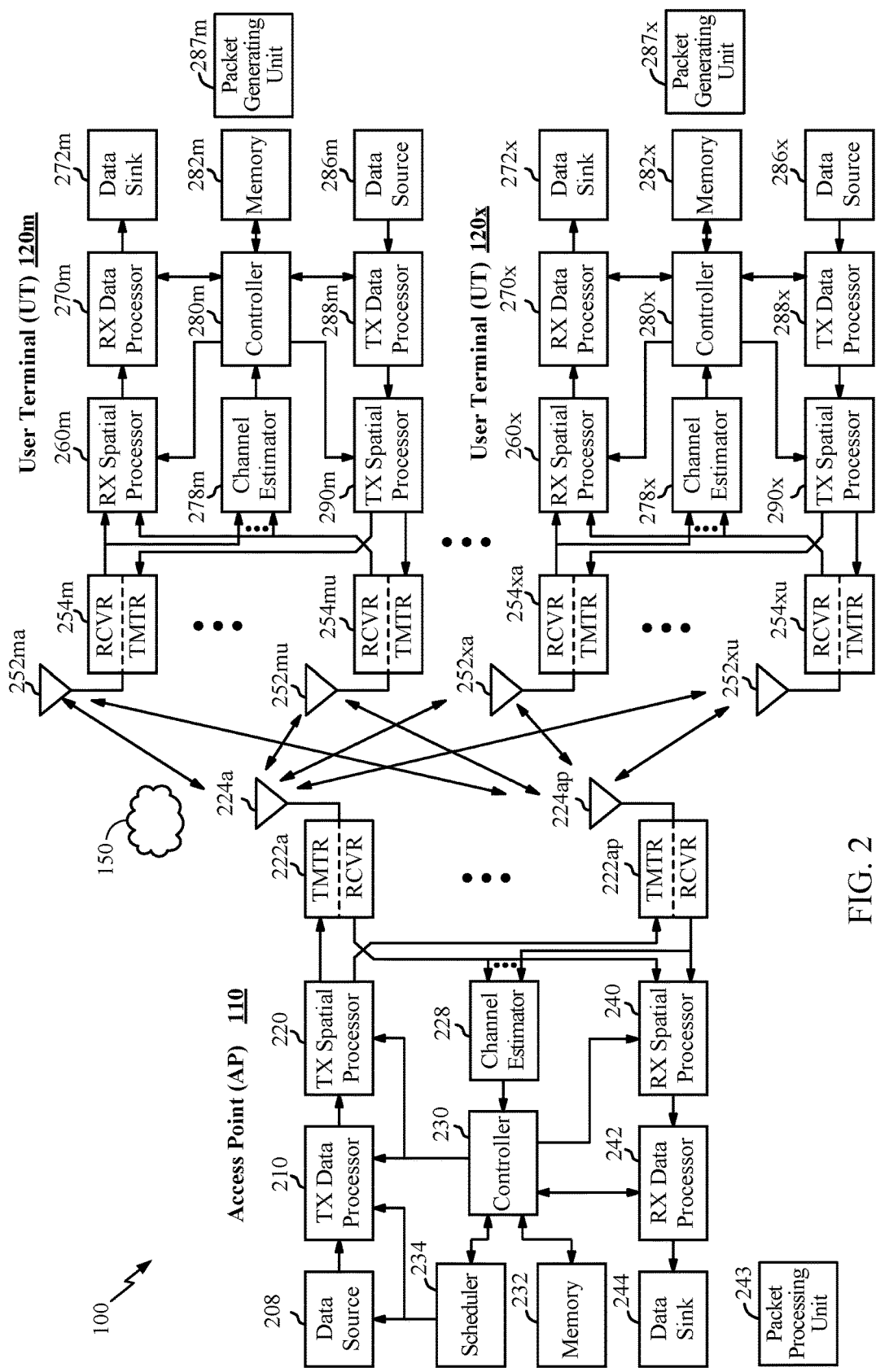
FIG. 2 is a block diagram of an example access point and example user terminals, in accordance with certain aspects of the present disclosure.

FIG. 2 illustrates a block diagram of access point 110 and two user terminals 120m and 120x in MIMO system 100. The access point 110 is equipped with $N_t$ antennas 224a through 224t. User terminal 120m is equipped with $N_{ut,m}$ antennas 252ma through 252mu, and user terminal 120x is equipped with $N_{ut,x}$ antennas 252xa through 252xu. The access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, Nup user terminals are selected for simultaneous transmission on the uplink, Ndn user terminals are selected for simultaneous transmission on the downlink, Nup may or may not be equal to Ndn, and Nup and Ndn may be static values or can change for each scheduling interval. The beam-steering or some other spatial processing technique may be used at the access point and user terminal.

On the uplink, at each user terminal 120 selected for uplink transmission, a TX data processor 288 receives traffic data from a data source 286 and control data from a controller 280. TX data processor 288 processes (e.g., encodes, interleaves, and modulates) the traffic data for the user terminal based on the coding and modulation schemes associated with the rate selected for the user terminal and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point.

Nup user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224a through 224ap receive the uplink signals from all Nup user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides Nup recovered uplink data symbol streams. The receiver spatial processing is performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective user terminal. An RX data processor 242 processes (e.g., demodulates, deinterleaves, and decodes) each recovered uplink data symbol stream in accordance with the rate used for that stream to obtain decoded data. The decoded data for each user terminal may be provided to a data sink 244 for storage and/or a controller 230 for further processing.

On the downlink, at access point 110, a TX data processor 210 receives traffic data from a data source 208 for Ndn user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 provides Ndn downlink data symbol streams for the Ndn user terminals. A TX spatial processor 220 performs spatial processing (such as a precoding or beamforming, as described in the present disclosure) on the Ndn downlink data symbol streams, and provides $N_{ap}$ transmit symbol streams for the $N_{ap}$ antennas. Each transmitter unit 222 receives and processes a respective transmit symbol stream to generate a downlink signal. $N_{ap}$ transmitter units 222 providing $N_{ap}$ downlink signals for transmission from $N_{ap}$ antennas 224 to the user terminals.

At each user terminal 120, $N_{ut,m}$ antennas 252 receive the $N_{ap}$ downlink signals from access point 110. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the user terminal. The receiver spatial processing is performed in accordance with the CCMI, MMSE or some other technique. An RX data processor 270 processes (e.g., demodulates, deinterleaves and decodes) the recovered downlink data symbol stream to obtain decoded data for the user terminal.

At each user terminal 120, a channel estimator 278 estimates the downlink channel response and provides downlink channel estimates, which may include channel gain estimates, SNR estimates, noise variance and so on. Similarly, a channel estimator 228 estimates the uplink channel response and provides uplink channel estimates. Controller 280 for each user terminal typically derives the spatial filter matrix for the user terminal based on the downlink channel response matrix $H_{dn,m}$ for that user terminal. Controller 230 derives the spatial filter matrix for the access point based on the effective uplink channel response matrix $H_{up,eff}$. Controller 280 for each user terminal may send feedback information (e.g., the downlink and/or uplink eigenvectors, eigenvalues, SNR estimates, and so on) to the access point. Controllers 230 and 280 also control the operation of various processing units at access point 110 and user terminal 120, respectively.

Figure 3:
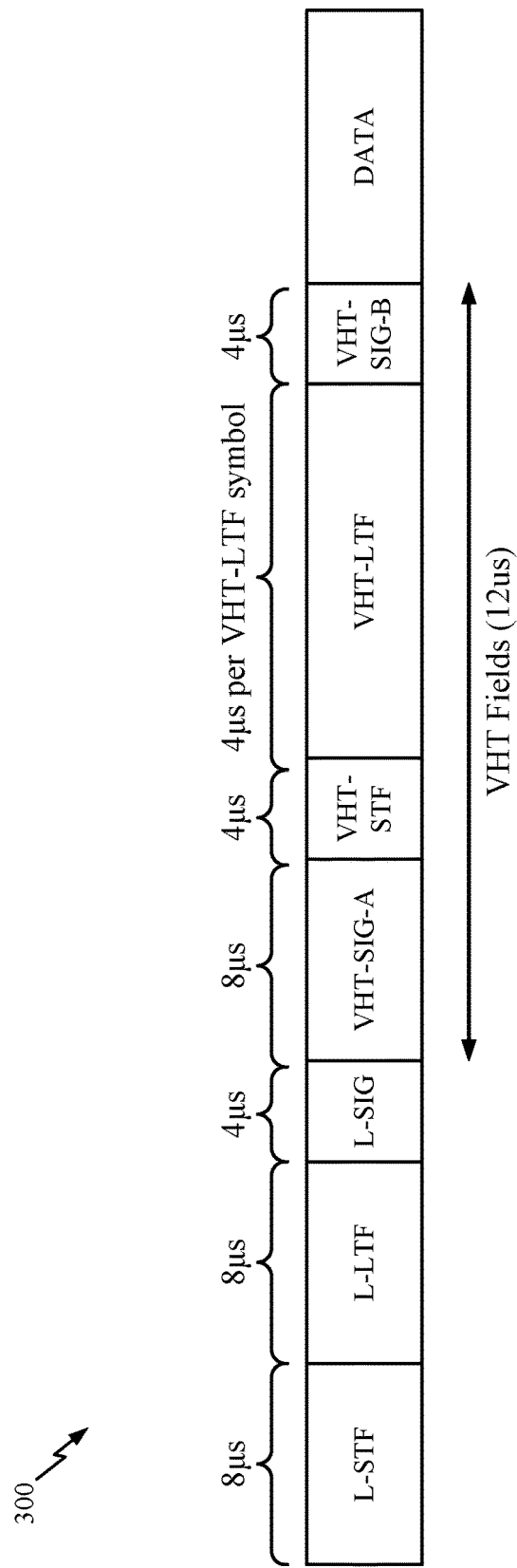
FIG. 3 illustrates an example mixed mode preamble format.
Figure 4:
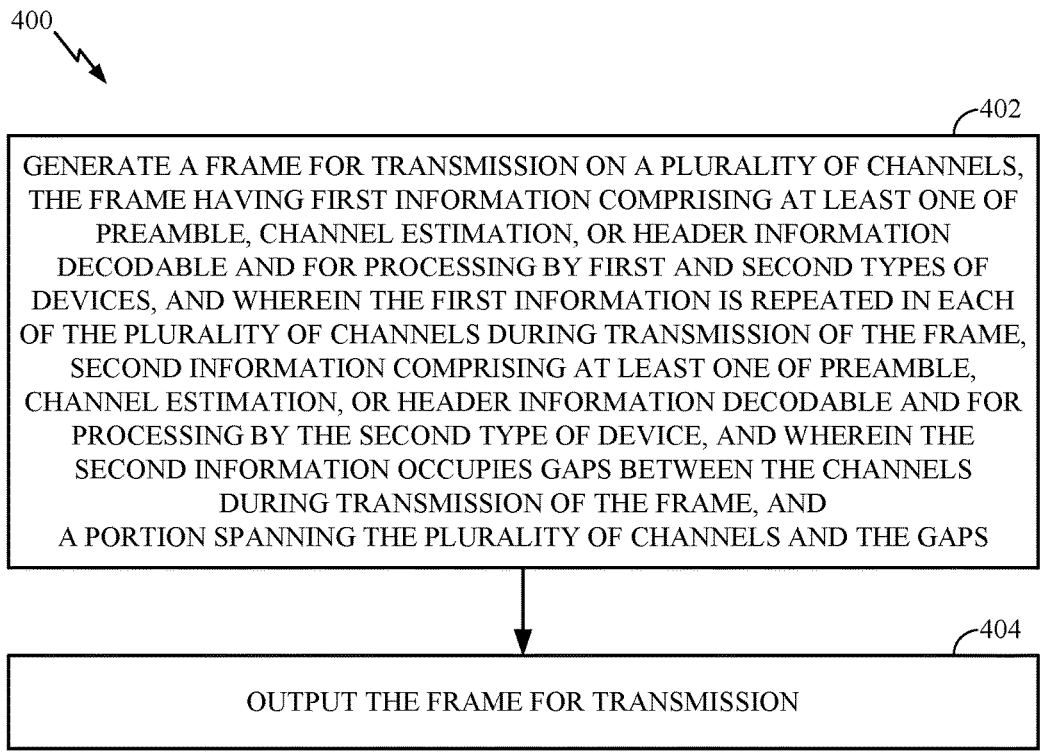
FIG. 4 is a flow diagram of example operations for generating a packet with preamble information transmitted in channel gaps, in accordance with certain aspects of the present disclosure.

As illustrated, in FIGS. 1 and 2, one or more user terminals 120 may send one or more High Efficiency WLAN (HEW) packets 150, with a preamble format as described herein (e.g., in accordance with one of the example formats shown in FIGS. 3A-4), to the access point 110 as part of a UL MU-MIMO transmission, for example. Each HEW packet 150 may be transmitted on a set of one or more spatial streams (e.g., up to 4). For certain aspects, the preamble portion of the HEW packet 150 may include tone-interleaved LTFs, subband-based LTFs, or hybrid LTFs (e.g., in accordance with one of the example implementations illustrated in FIGS. 10-13, 15, and 16).

The HEW packet 150 may be generated by a packet generating unit 287 at the user terminal 120. The packet generating unit 287 may be implemented in the processing system of the user terminal 120, such as in the TX data processor 288, the controller 280, and/or the data source 286.

After UL transmission, the HEW packet 150 may be processed (e.g., decoded and interpreted) by a packet processing unit 243 at the access point 110. The packet processing unit 243 may be implemented in the process system of the access point 110, such as in the RX spatial processor 240, the RX data processor 242, or the controller 230. The packet processing unit 243 may process received packets differently, based on the packet type (e.g., with which amendment to the IEEE 802.11 standard the received packet complies). For example, the packet processing unit 243 may process a HEW packet 150 based on the IEEE 802.11 HEW standard, but may interpret a legacy packet (e.g., a packet complying with IEEE 802.11a/b/g) in a different manner, according to the standards amendment associated therewith.

Example Frame Format for Low Latency Channel Bonding

Aspects of the present disclosure provide techniques for reducing latency in systems devices by transmitting legacy-decodable preamble information in each of multiple channels and for transmitting preamble information for channel estimation of a multi-channel transmission in gaps between the multiple channels.

The techniques may be used, for example, when transmitting in multiple channels (e.g., double/triple/quadraple 802.11 bands), in systems with legacy devices (capable of only communicating in a single band) need to be informed about the multi-channel transmitted packet, so they can update their respective NAV even if they are working in single band.

One approach (e.g., for 802.11n and 802.11ac and 802.11ax STAs), is to send preamble information (e.g., the preambles/CES/data that are sent prior to the multi-channel data), in all single channels overlapping the multi-channel. Since several estimations are required to enable double channel operation, the STAs are sending additional preamble\CES\Header using double channel (known as HT-STF and VHT-STF and HT-LTF and VHT-LTF in 802.11n and 802.11ac respectively).

An example of such a format is shown in FIG. 3. While this format allows stations to achieve double channel estimations (via the HT/VHT fields) and single channel protection (via the legacy portion), it also significantly increases latency.

Aspects of the present disclosure, however, provide techniques for doubling the channel on wireless transmissions (e.g., for advanced or future generations of standard, such as 802.11 ad, or other standards), by sending additional preambles and channel estimation for the multi-channel in gaps between channels. This approach may still enable the legacy single band receiver to be able to receive without any significant degradation (since header sensitivity may be very low, ~−5 dB) while allowing multiple channel stations to use (substantially) the same time interval for all multi-channel estimations. Thus, the techniques presented herein may help avoid at least some of the additional latency described above with reference to FIG. 3.

FIG. 4 is a flow diagram of example operations 400 for generating frames, in accordance with certain aspects of the present disclosure. The operations 400 may be performed by an apparatus, such as an AP (e.g., access point 110).

The operations 400 may begin, at 402, by generating a frame for transmission on a plurality of channels, the frame having first information comprising at least one of preamble, channel estimation, or header information decodable and for processing by first and second types of devices, and wherein the first information is repeated in each of the plurality of channels during transmission of the frame, second information comprising at least one of preamble, channel estimation, or header information decodable and for processing by the second type of device, and wherein the second information occupies gaps between the channels during transmission of the frame, and a portion spanning the plurality of channels and the gaps. At 404, the frame is output for transmission.

Figure 5:
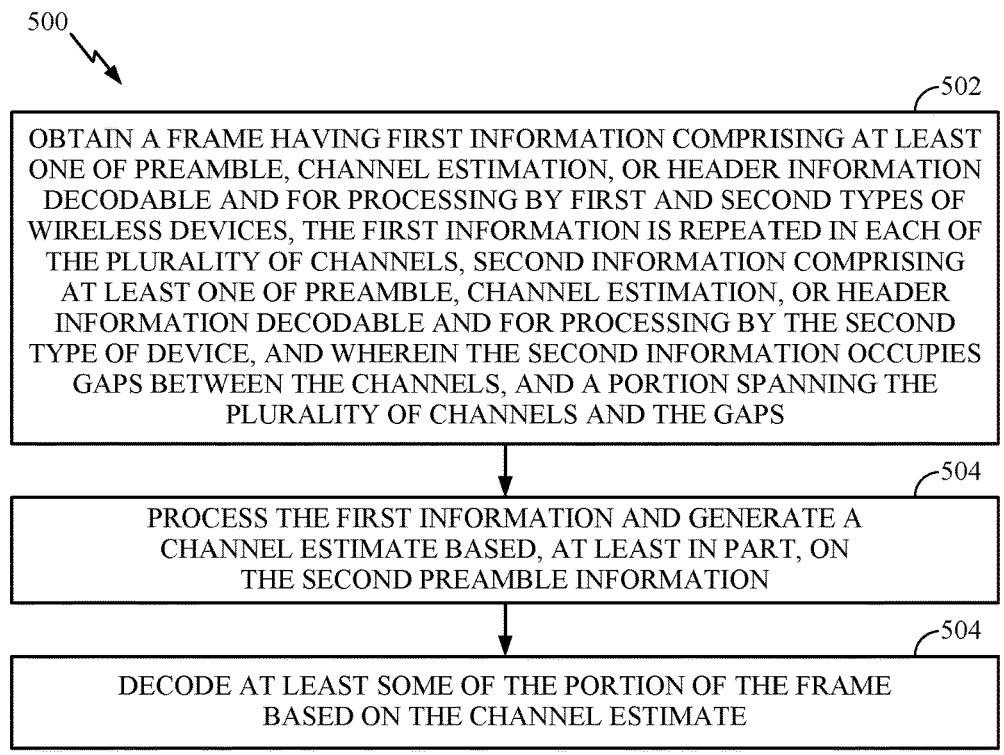
FIG. 5 is a flow diagram of example operations for processing a packet with preamble information transmitted in channel gaps, in accordance with certain aspects of the present disclosure.

FIG. 5 is a flow diagram of example operations 500 for processing one or more packets, in accordance with certain aspects of the present disclosure. The operations 500 may be performed by an apparatus, such as an STA (e.g., user terminal 120), and may be considered complementary to operations 400 of FIG. 4.

The operations 500 begin, at 502, by obtaining a frame having first information comprising at least one of preamble, channel estimation, or header information decodable and for processing by first and second types of wireless devices, the first information is repeated in each of the plurality of channels, second information comprising at least one of preamble, channel estimation, or header information decodable and for processing by the second type of device, and wherein the second information occupies gaps between the channels, and a portion spanning the plurality of channels and the gaps. At 504, station processes the first information and generates a channel estimate based, at least in part, on the second information. At 506, the station decodes at least some of the remaining portion of the frame based on the channel estimate.

FIGS. 6, 7, 10-12, and 15-18 each show various frame preamble formats, in accordance with aspects of the present disclosure. In the case of data frames, the preambles will be followed by a DATA/Payload field (such as that shown in FIG. 3) and, in some cases, optional AGC & TRN fields (e.g., as in 802.11ad). The preamble formats described herein, however, may also be used in non-data frames (e.g., used for simple signaling).

Figure 6:
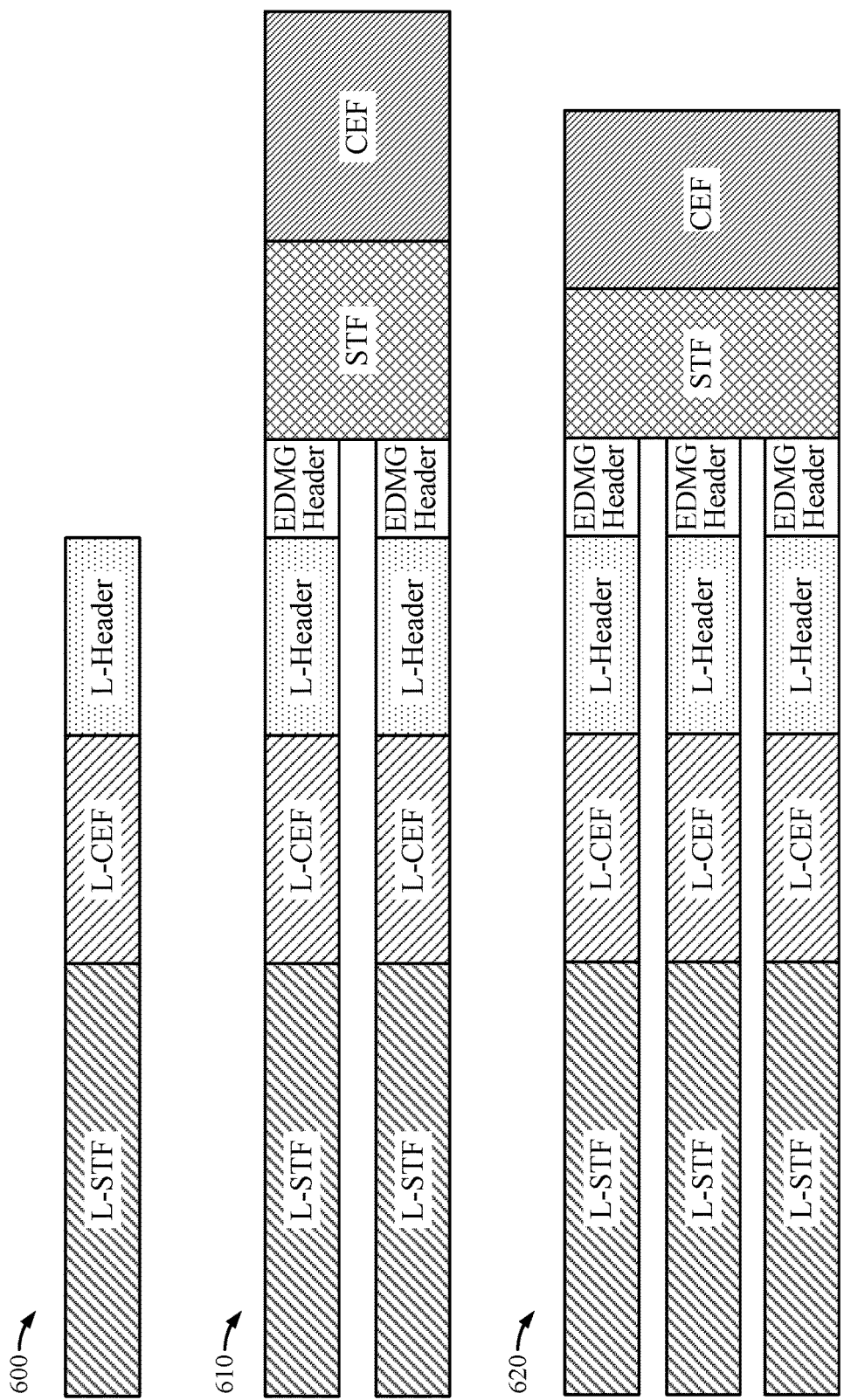
FIGS. 6 and 7 illustrate example frame formats, in accordance with certain aspects of the present disclosure.

FIG. 6 illustrates an example legacy frame format 600 that may include legacy fields (recognizable by legacy type devices), such as a legacy short training field (L-STF), a legacy channel estimation field (L-CEF), and a legacy header (L-Header) field. As illustrated, these legacy fields may be repeated across multiple channels. For example, as shown at 610 and 620, the legacy format may be repeated across double or triple channels. As illustrated, in either case, additional header and preamble information may be sent after the legacy preamble, in an enhanced directional multi-gigabit (EDMG) header, to allow for channel estimation of subsequent multi-channel data (not shown). The legacy preamble may be followed by a (non-legacy) short training field (STF) and/or a (non-legacy) channel estimation field (CEF).

Figure 7:
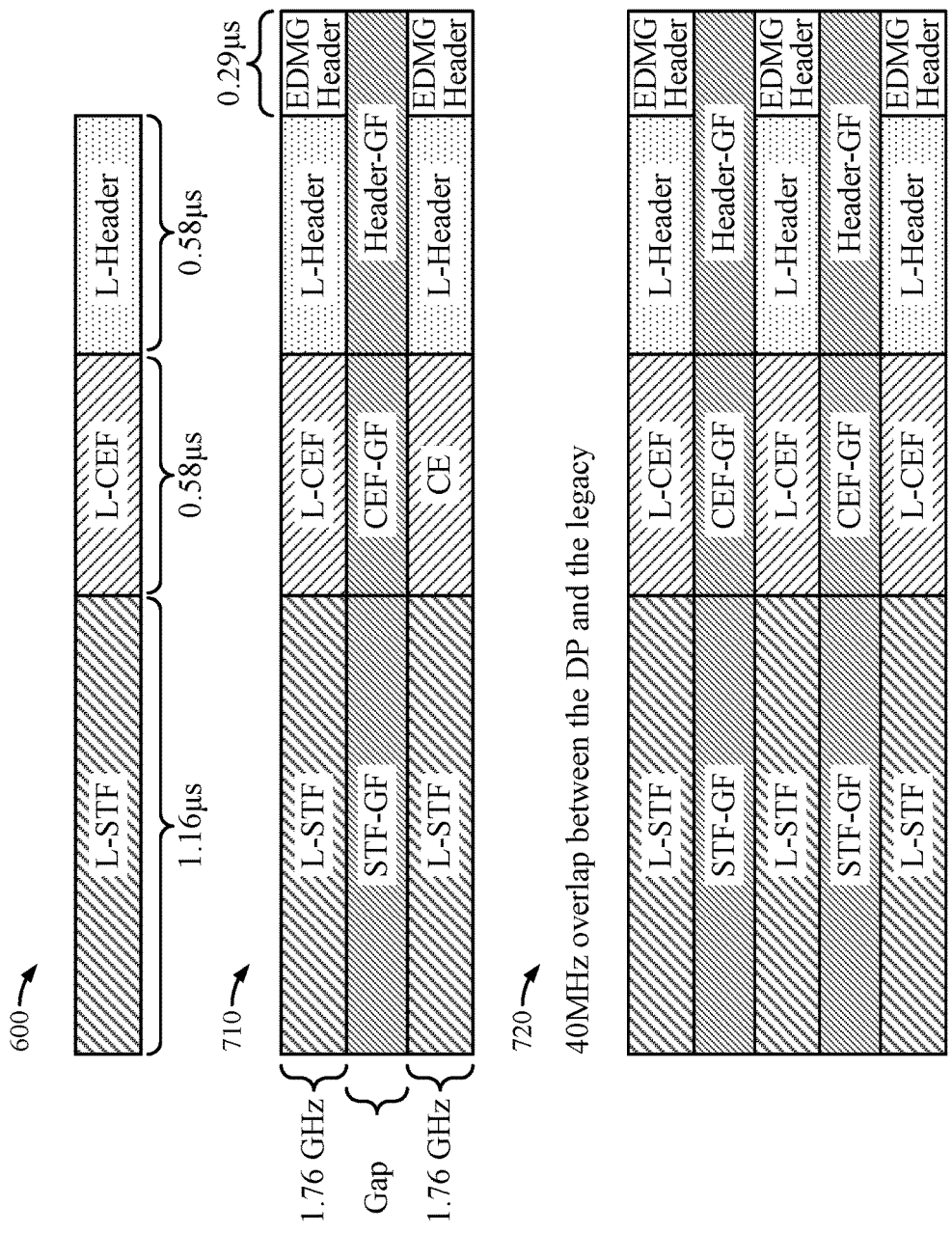

As illustrated in FIG. 7, however, rather than include this additional information after the legacy preambles, the additional information may be included earlier, in gap-fillers (GFs), using gaps between the multiple channels. For example, as shown at 710 and 720, the additional information may be included in a single gap between double channels or in two gaps between triple channels. In general, for a transmission on n channels, additional information could be transmitted in n−1 gaps.

As illustrated, assuming 1.76 GHz channels, the additional information may be transmitted in a 0.44 GHz gap (e.g., approximately ¼ the size of each of the channels). As illustrated, the additional information in the gap-filler may include a short training field (STF-GF) and/or a channel estimation (CE-GF) field. As shown, the frame may also include subsequent header information (HEADER-GF), decodable by the second type of device, occupying the same channels as the first preamble information.

As illustrated, the remaining portion comprises at least one of a short training field (STF) spanning the plurality of channels and a field with information for channel estimation (CE) spanning the plurality of channels. A receiving station may decode a data portion of the remaining portion of the frame, based, at least in part, on the STF and CE fields spanning the plurality of channels.

Example Frame Formats for MIMO and/or Channel Bonding

Certain aspects of the present disclosure provide techniques for generating and processing frame structures with certain preamble information decodable by only certain types of devices. So called "Green-Field" preambles may be used, for example, in scenarios where it is assumed that other types of devices (e.g., legacy devices) are not present and, thus, do not need to be accommodated. Such preambles may be used with MIMO transmissions involving two or more spatial streams, as well as channel bonding involving two or more channels.

Figure 8:
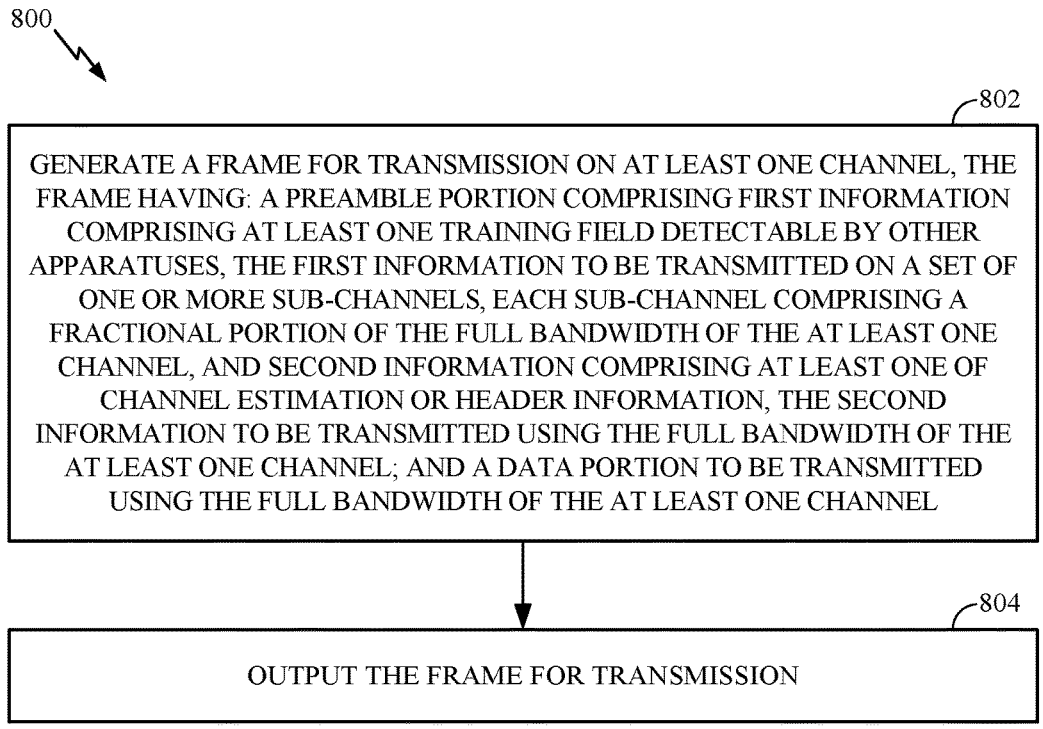
FIG. 8 is a flow diagram of example operations for generating a packet, in accordance with certain aspects of the present disclosure.
Figure 8A:
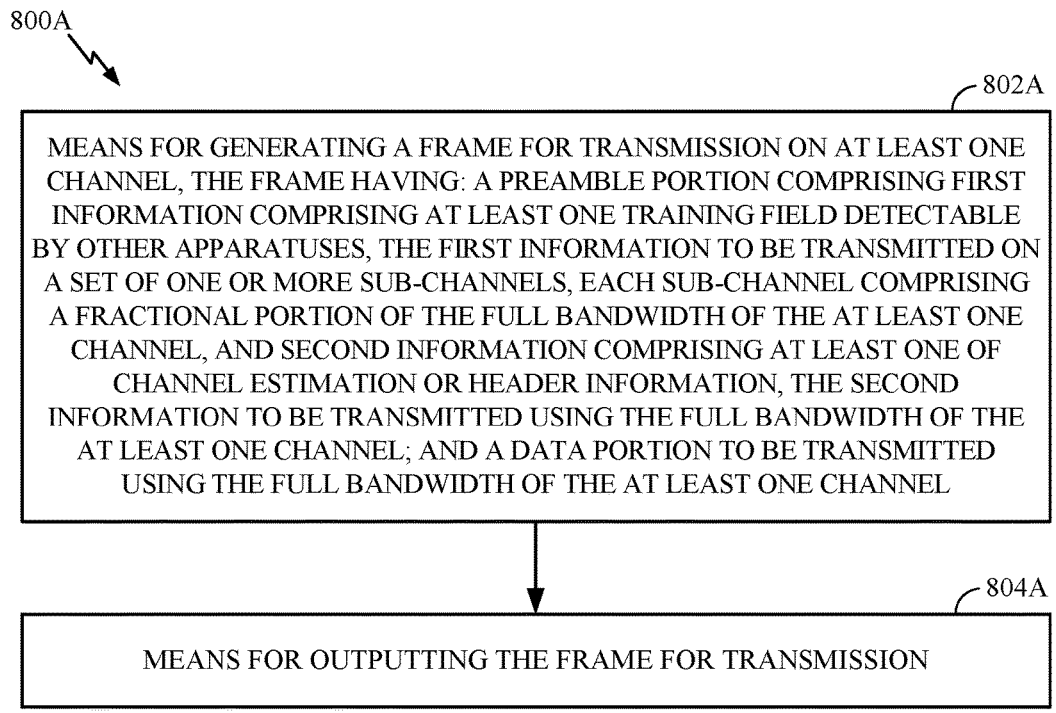
FIG. 8A illustrates example means capable of performing the operations shown in FIG. 8.

FIG. 8 is a flow diagram of example operations 800 for generating frames, in accordance with certain aspects of the present disclosure. The operations 800 may be performed by an apparatus, such as an AP (e.g., access point 110).

The operations 800 may begin, at 802, by generating a frame for transmission on at least one channel, the frame having: a preamble portion comprising first information comprising at least one training field detectable by other apparatuses, the first information to be transmitted on a set of one or more sub-channels, each sub-channel comprising a fractional portion of the full bandwidth of the at least one channel, and second information comprising at least one of channel estimation or header information, the second information to be transmitted using the full bandwidth of the at least one channel; and a data portion to be transmitted using the full bandwidth of the at least one channel. At 804, the frame is output for transmission.

Figure 9:
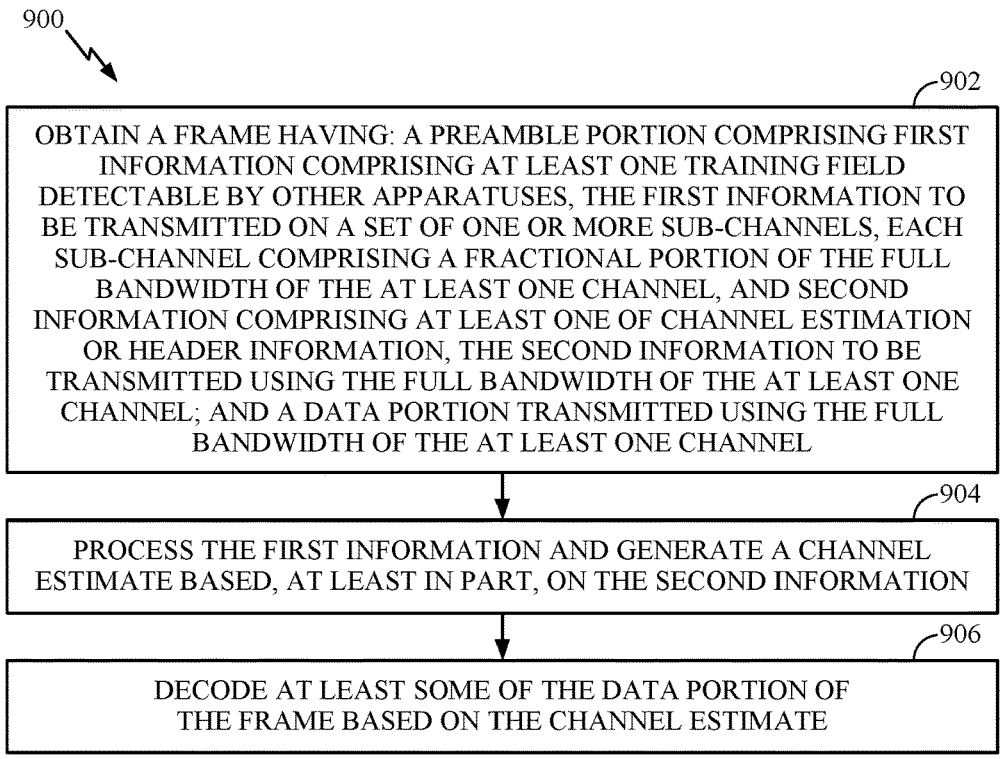
FIG. 9 is a flow diagram of example operations for processing a packet, in accordance with certain aspects of the present disclosure.
Figure 9A:
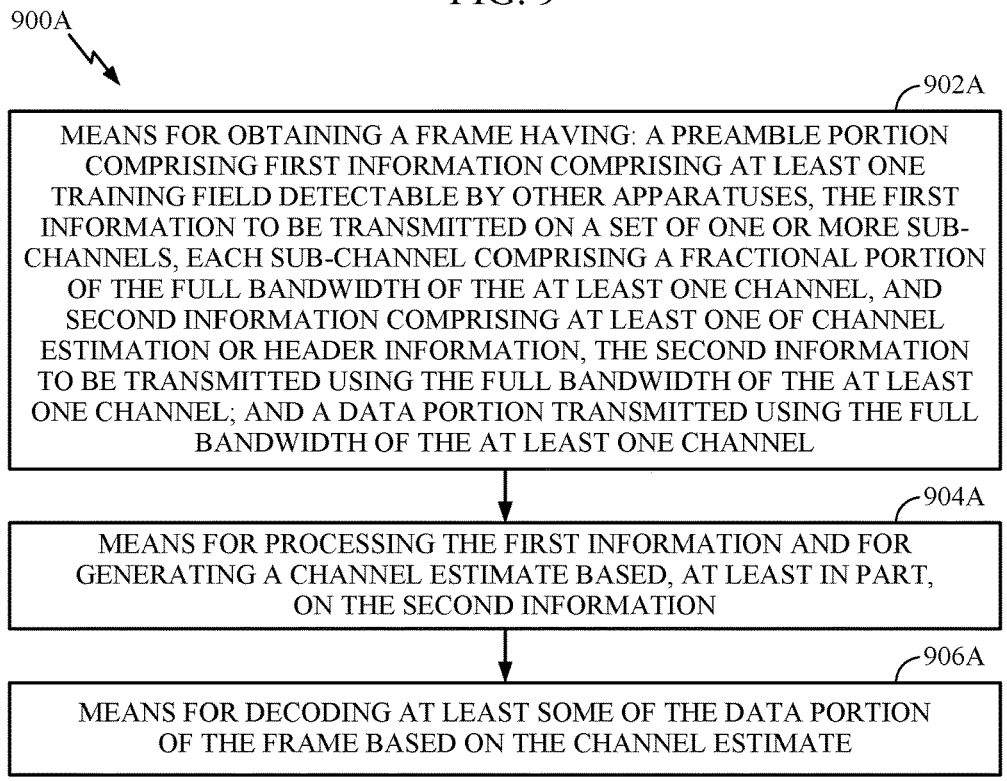
FIG. 9A illustrates example means capable of performing the operations shown in FIG. 9.

FIG. 9 is a flow diagram of example operations 900 for processing one or more packets, in accordance with certain aspects of the present disclosure. The operations 900 may be performed by an apparatus, such as an STA (e.g., user terminal 120), and may be considered complementary to operations 800 of FIG. 8.

The operations 900 begin, at 902, by obtaining a frame having: a preamble portion comprising first information comprising at least one training field detectable by other apparatuses, the first information to be transmitted on a set of one or more sub-channels, each sub-channel comprising a fractional portion of the full bandwidth of the at least one channel, and second information comprising at least one of channel estimation or header information, the second information to be transmitted using the full bandwidth of the at least one channel. At 904, the station processes the first information and generate a channel estimate based, at least in part, on the second information. At 906, the station decodes at least some of the remaining portion of the frame based on the channel estimate.

Figure 10:
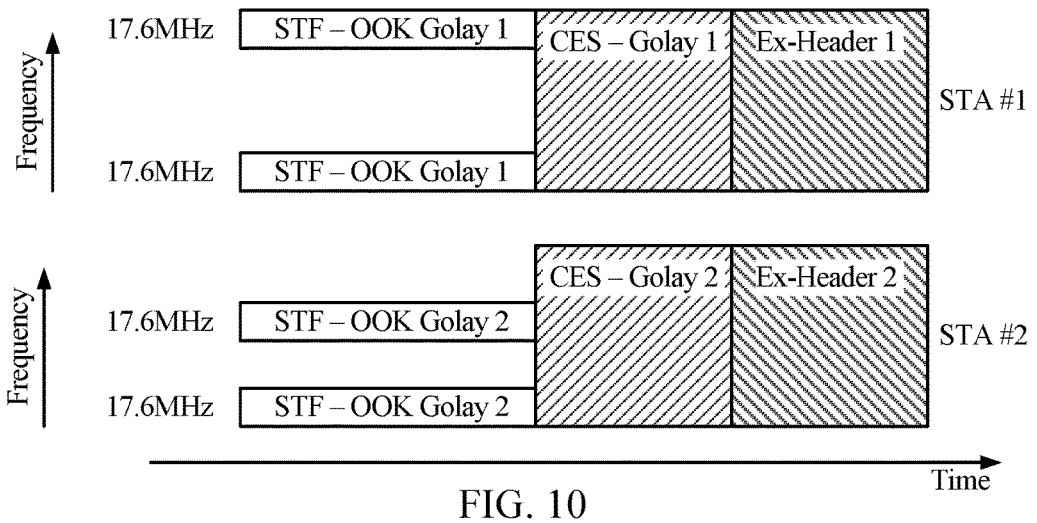
FIGS. 10-12 illustrate example frame formats, in accordance with certain aspects of the present disclosure.
Figure 11:
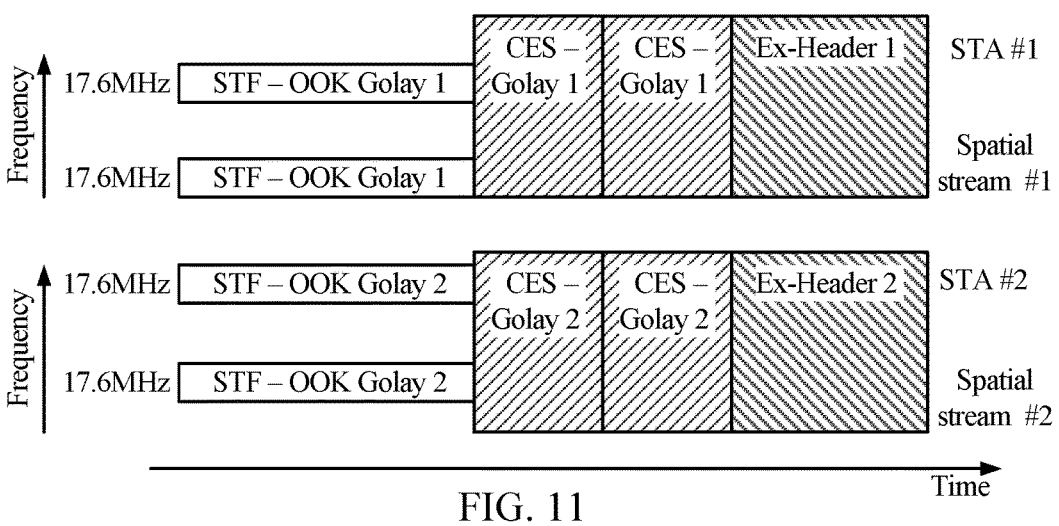
Figure 12:
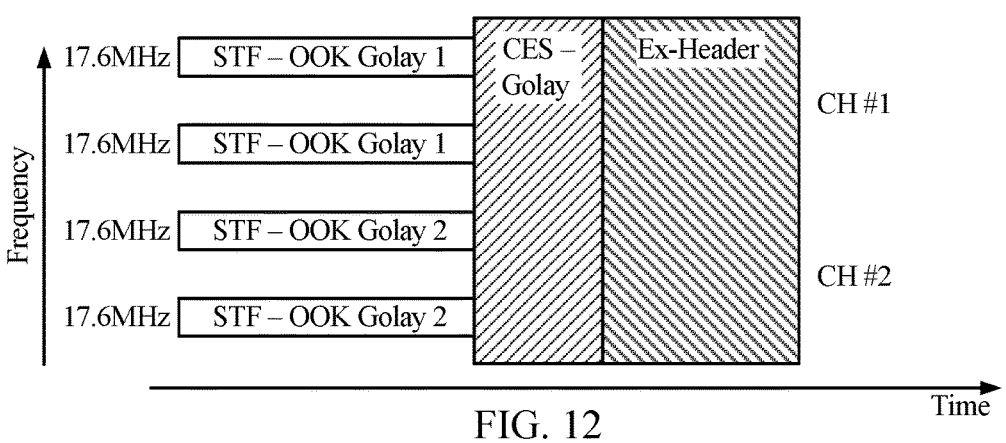

FIGS. 10-12 illustrate example frame formats with (Green-Field) preambles for use with MIMO and/or channel bonding, in accordance with certain aspects of the present disclosure. The preambles may have a training field (e.g., a short training field STF) transmitted in a relatively narrow band that allows for FDMA-based detection by other devices.

FIG. 10 shows an example frame structure with such a preamble. As illustrated, for a first station, STFs based on a first Golay code (Golay 1) may be transmitted on relatively narrowband channels (e.g., 17.6 MHz) within the wider channel bandwidth. As illustrated, for a second station the STFs may be based on a second Golay code (Golay 2) and the frame may be transmitted in a second channel.

The STF may, for example, be formed with a Golay code of length of 16 rather than 128. Such a structure may allow for low-power detection at the receiver (<33 factor during the STF phase) and may allow multiple stations to work within the same band, fully utilizing the spatial separation during the acquisition phase. Use of multiple bands in this manner may help overcome channel frequency selectiveness (e.g., with deliberate selection of the location of narrowband channel sets within the wider transmission channel).

As illustrated, the narrowband STFs may be followed by channel estimation sequences (CES) and header information spanning the width of the transmission channel. As illustrated in FIG. 10, different STAs may use different CES to reduce interference. The header information may include information used to demodulate the data, and the header information may be demodulated by all stations in range.

As described above, STF may be transmitted in relatively narrowband channels. For example, STF may be transmitted over a 17.6 MHz channel, with 100 such channels available for a 1.76 GHz transmission channel. Each transmission may use a set of N1 of these channels. In some cases, one N1 set of channels may be allocated for non-associated stations, while other sets of channels may allocated to associated stations (by the AP).

As illustrated in FIG. 11, for MIMO transmissions, the station may use a similar frame format, but with different sets of channels for STF for each spatial stream. Further, as illustrated, a STA in MIMO mode may use more CES for MIMO. The different sets of STF channels for the different streams may be non-overlapping. In this case, there may be no need for cyclic shift delay (CSD). While 2 spatial streams are shown as an example, it should be understood that the techniques may be applied to any number of streams.

As illustrated in FIG. 12, a similar frame structure may also be used for transmissions with channel bonding (using bandwidth of two or more channels). In this example, STF may be transmitted on all channels, while different STF frequencies may be used for the different (bonded) channels. CES and the (extended) header information (Ex-Header) may be transmitted on the bonded channels. In this case, there may be no need for CSD. While 2 channels are shown as an example of channel bonding, it should be understood that the techniques may be applied to any number of bonded channels (and may include contiguous and/or non-contiguous channels).

In some cases, similar preamble structures may be used for transmissions using both MIMO and channel bonding. In this case, the preamble format may be similar to that shown in FIG. 11, but across wider bandwidth due to the bonded channels. As described above, STF may be transmitted an all (bonded) channels, but with different STF frequencies per spatial stream.

Certain aspects of the present disclosure also provide techniques for generating and processing frame structures with backward-compatible preambles (e.g., preambles with certain information decodable by legacy devices). These preambles may be used, for example, in non Green-Field scenarios, where different types of devices may be present.

Figure 13:
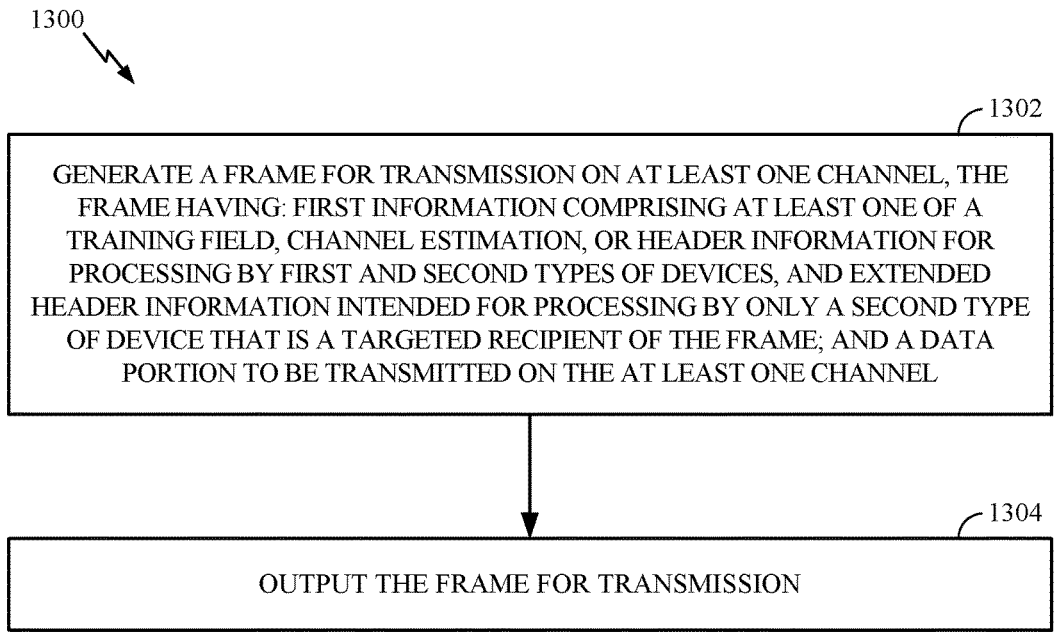
FIG. 13 is a flow diagram of example operations for generating a packet, in accordance with certain aspects of the present disclosure.
Figure 13A:
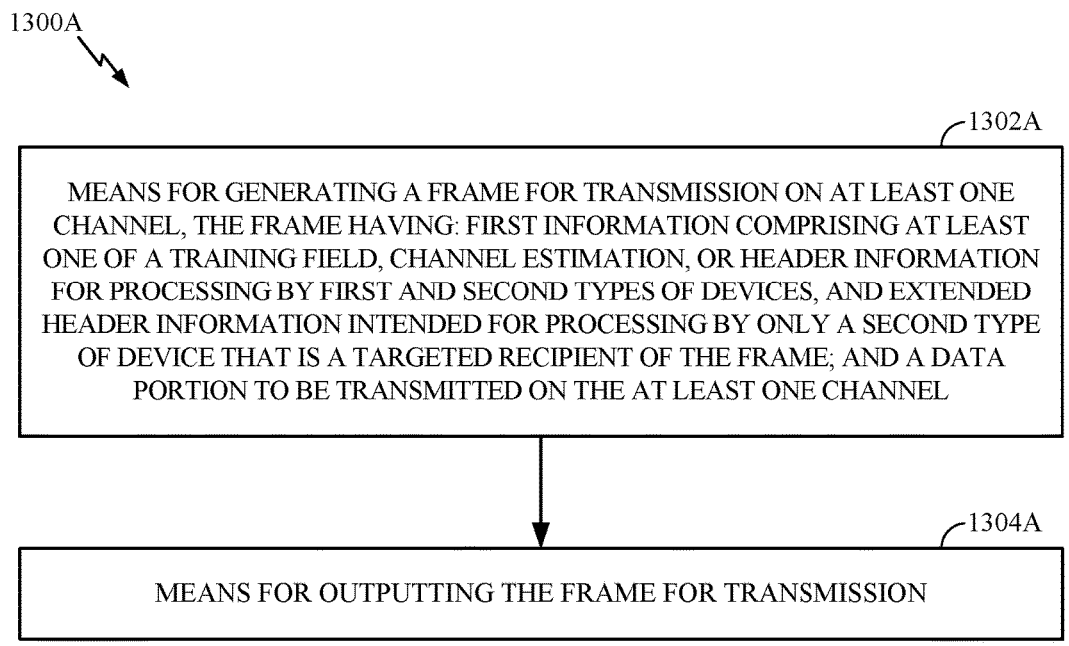
FIG. 13A illustrates example means capable of performing the operations shown in FIG. 13.

FIG. 13 is a flow diagram of example operations 1300 for generating frames, in accordance with certain aspects of the present disclosure. The operations 1300 may be performed by an apparatus, such as an AP (e.g., access point 110).

The operations 1300 may begin, at 1302, by generating a frame for transmission on at least one channel, the frame having: first information comprising at least one of a training field, channel estimation, or header information for processing by first and second types of devices, and extended header information intended for processing by only a second type of device that is a targeted recipient of the frame; and a data portion to be transmitted on the at least one channel. At 1304, the frame is output for transmission.

Figure 14:
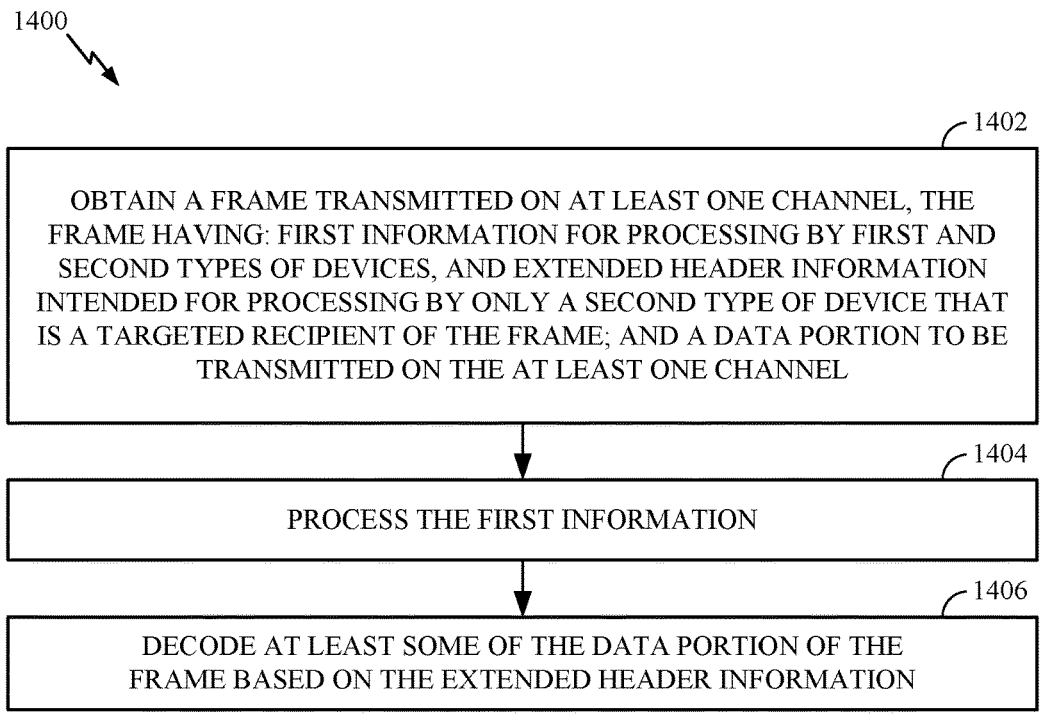
FIG. 14 is a flow diagram of example operations for processing a packet, in accordance with certain aspects of the present disclosure.
Figure 14A:
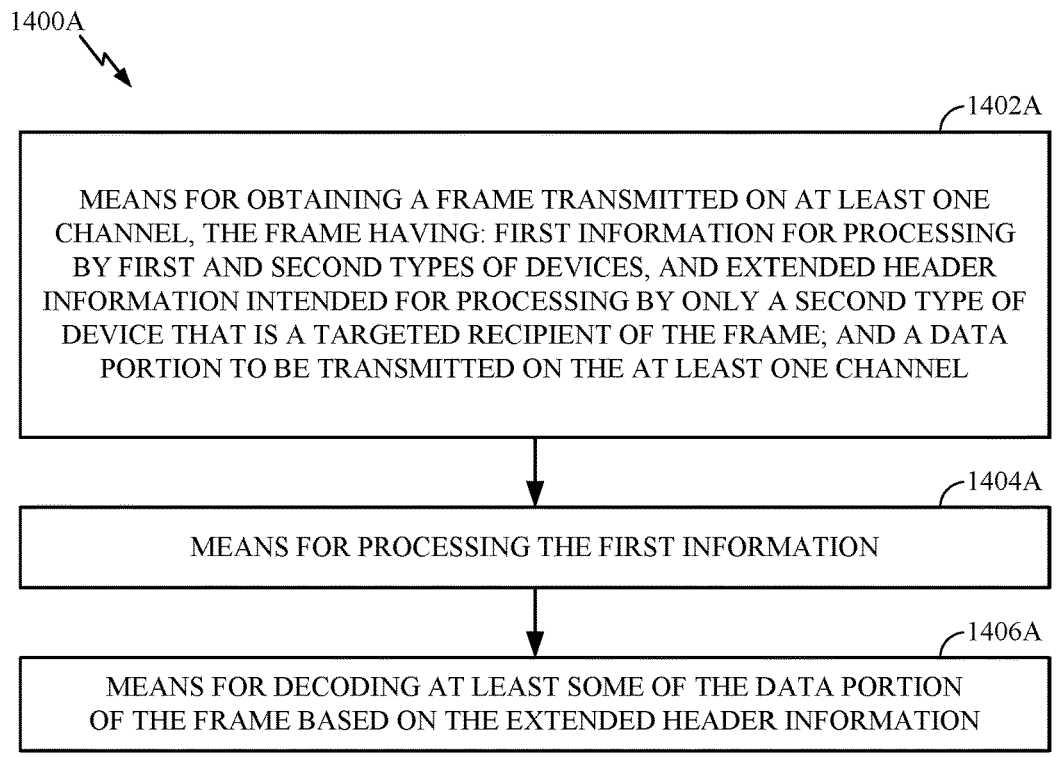
FIG. 14A illustrates example means capable of performing the operations shown in FIG. 14.

FIG. 14 is a flow diagram of example operations 1400 for processing one or more packets, in accordance with certain aspects of the present disclosure. The operations 1400 may be performed by an apparatus, such as an STA (e.g., user terminal 120), and may be considered complementary to operations 1300 of FIG. 13.

The operations 1400 begin, at 1402, by obtaining a frame transmitted on at least one channel, the frame having: first information (e.g., comprising at least one of a training field, channel estimation, or header information) for processing by first and second types of devices, and extended header information intended for processing by only a second type of device that is a targeted recipient of the frame; and a data portion to be transmitted on the at least one channel. At 1404, the station processes the first information and, at 1406, the station decodes at least some of the data portion of the frame based on the extended header information.

FIGS. 15-18 illustrate example frame formats with backward-compatible preamble structures, in accordance with certain aspects of the present disclosure.

Figure 15:
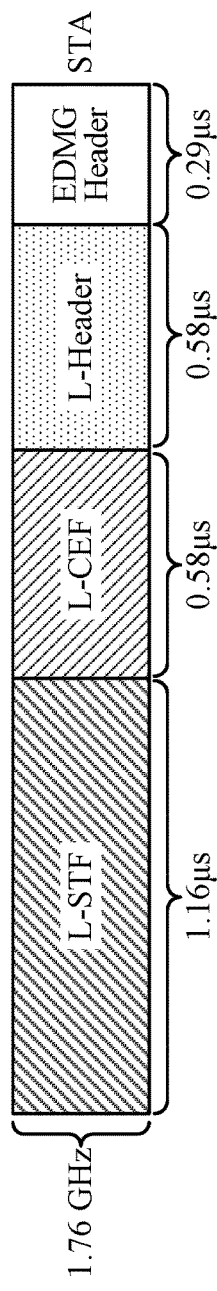
FIGS. 15-18 illustrate example frame formats, in accordance with certain aspects of the present disclosure.

For example, FIG. 15 illustrates an example preamble structure that may be used for transmissions without MIMO or channel bonding. As illustrated, the preamble structure may maintain some legacy (e.g., IEEE 802.11ad) preamble features, for example, with L-STFs, L-CEFs, and L-Header information. This may allow for maximum collision protection (by legacy and non-legacy devices).

As shown, however, the preamble structure may also include extended header information, for example, an enhanced directional multi-gigabit (EDMG) header to allow for new modes. While the header information may include information used to demodulate the data, and the header information may be demodulated by all stations in range. The extended heard may include additional information that is used only for the receiving station.

Figure 16:
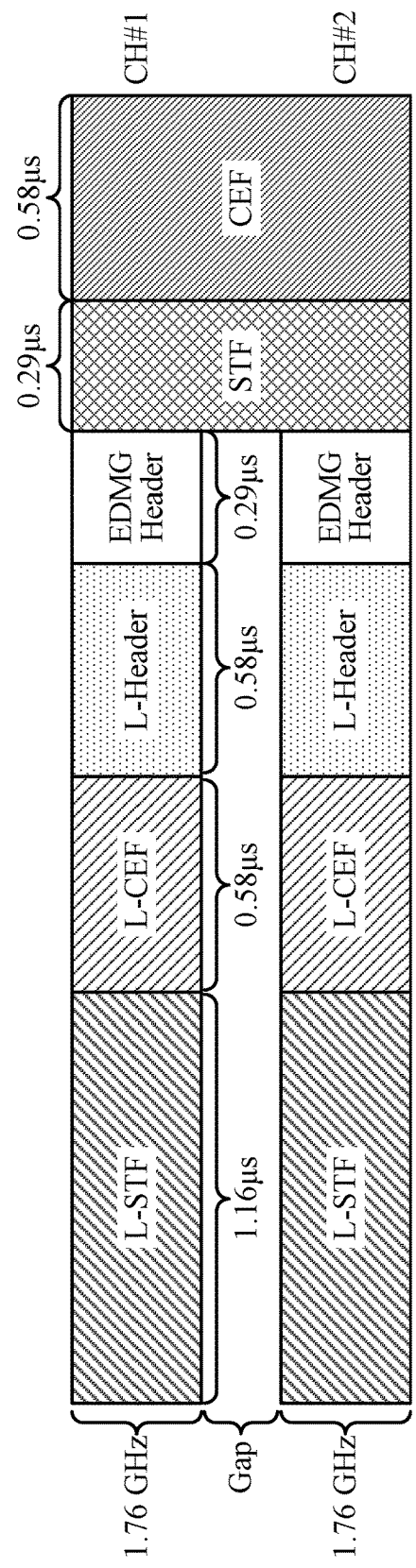

As illustrated in FIG. 16, a similar structure may be utilized for frames transmitted with channel bonding. In this case, legacy preambles, with L-STF, L-CES, and Header may be transmitted per channel, with extended headers, followed by a wider channel STF and CEF (due to the channel bonding). The STF and CEF that follow the EDMG Headers may be new (e.g., non-legacy) sequences.

Figure 17:
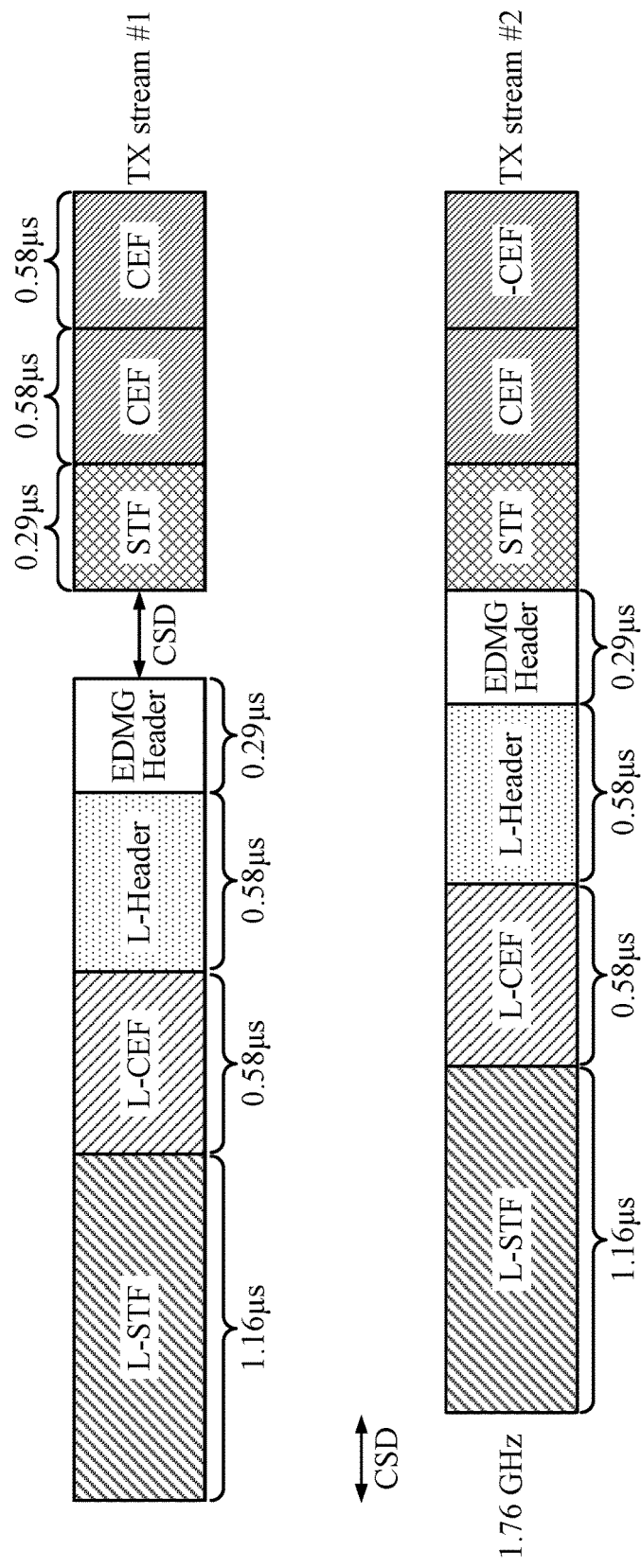

As illustrated in FIG. 17, a similar structure may be utilized for frames transmitted with MIMO, but without channel bonding. In this case, legacy preambles, with L-STF, L-CEF, and L-Header may be used per stream, with extended headers (e.g., EDMG Headers), followed by a (non-legacy) STF and CEFs. As with the channel bonding example, the STF and CEF that follow (e.g., CEF and –CEF) the EDMG Headers may be new sequences.

As shown, in some cases, the preamble for one stream may be delayed (relative to the other stream) by a cyclic shift delay (CSD) to allow for distinguishing the two streams (transmitted on the same channel). To time align the fields of the different streams after the preamble, a CSD may be applied after the extended header for the stream whose preamble was not initially delayed. As illustrated, the overall overhead in the illustrated example may be relatively low (e.g., 5.3 us for 4×4 MIMO).

While the illustrated examples shows MIMO of 2×2 by presenting one side, it should be understood that the techniques may be applied in a similar manner to other MIMO cases (e.g., 3×3, 4×4, as well as non-symmetric cases n×m, with 1<=n<=4 & 1<=m<=4 & n< >m). In such cases, there may be a different CSD for each spatial stream.

Figure 18:
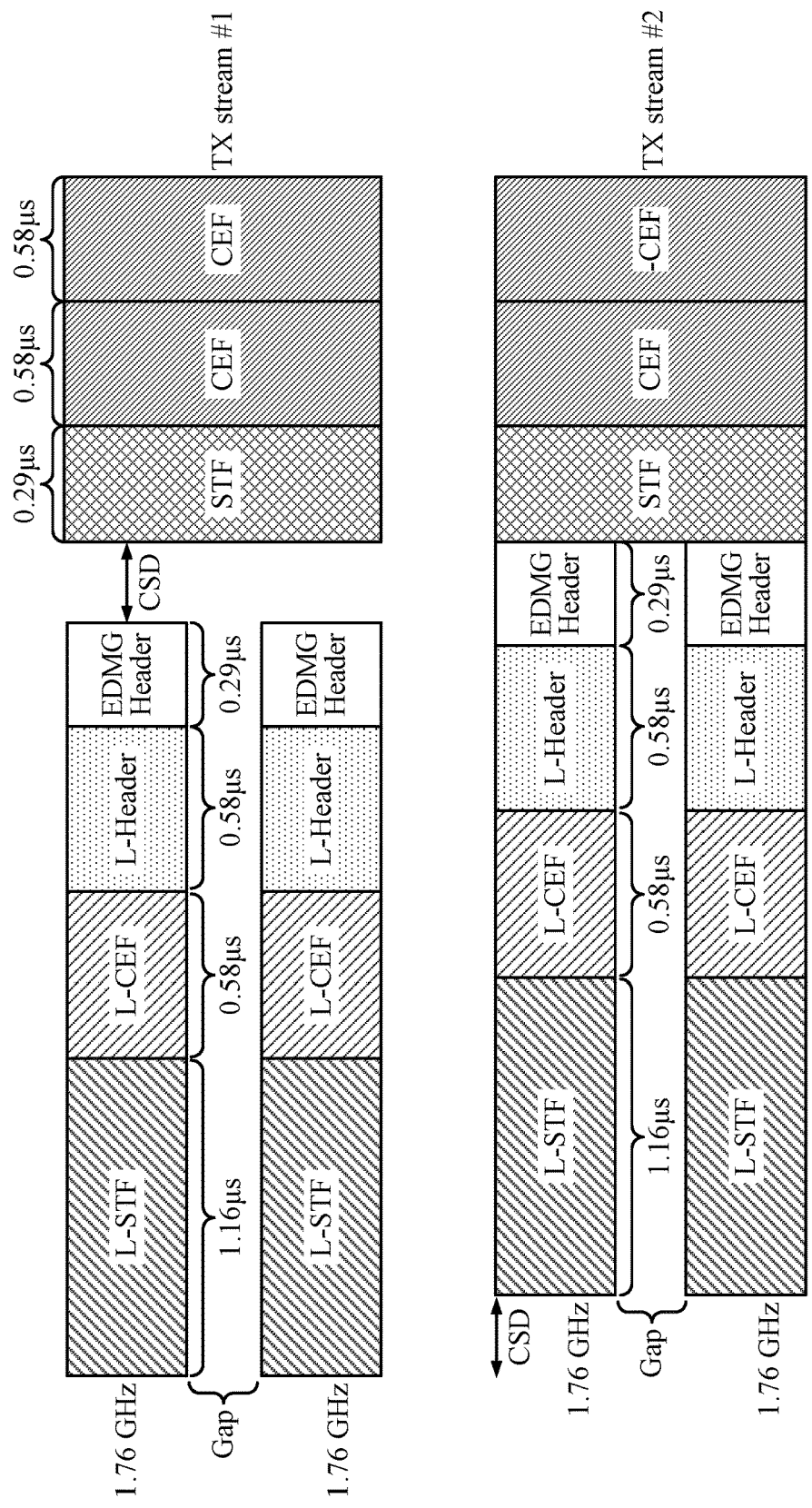

As shown in FIG. 18, similar preamble structures may be used for transmissions using both MIMO and channel bonding. In this case, the preamble format may be a combination of the formats shown in FIGS. 16 and 17. Again, using legacy preambles, with L-STF, L-CEF, and L-Header, per stream and per channel, may allow for enhanced collision protection. Adding the extended (EDMG) header information, followed by a wider channel, MIMO STF, CEF, and CSD, may still result in a relatively low overall overhead (e.g., of 18 ns).

In the illustrated example, the preamble may be repeated in each of the bonded channels similar to that shown in FIG. 11, but across wider bandwidth due to the bonded channels. Similarly, for MIMO, the preamble may be transmitted for each spatial stream, with the CSD applied to distinguish the preambles of the different streams, and to time align the wideband portions, such as (non-legacy) STF and CEFs (e.g., CEF and –CEF).

Figure 4A:
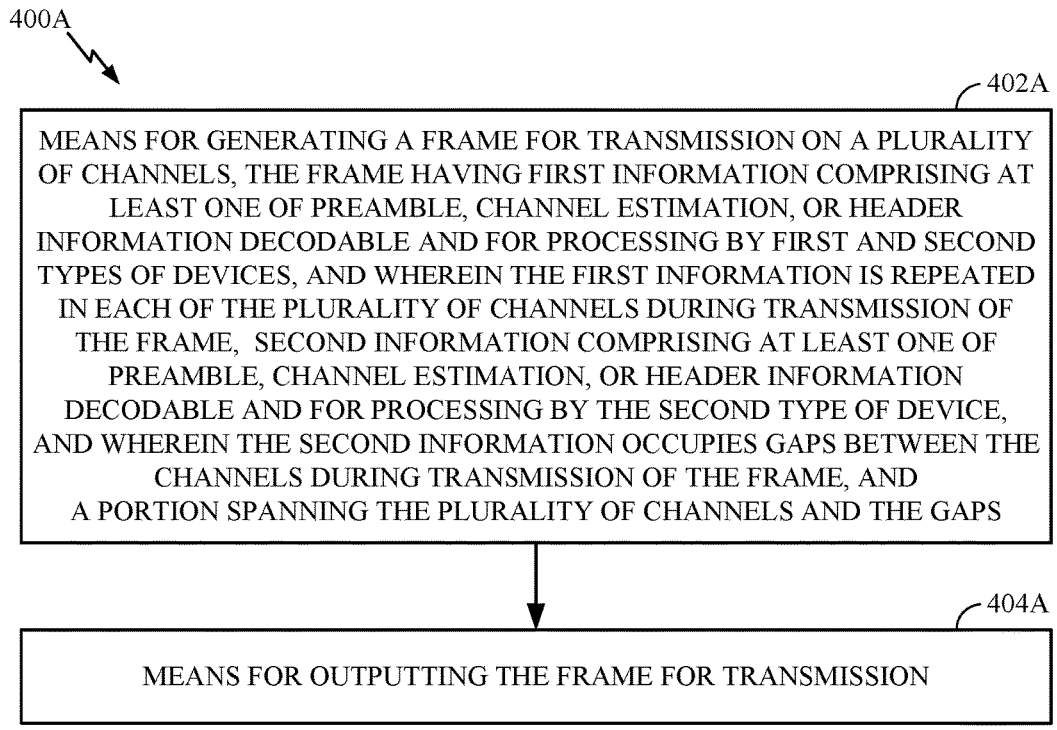
FIG. 4A illustrates example means capable of performing the operations shown in FIG. 4.
Figure 5A:
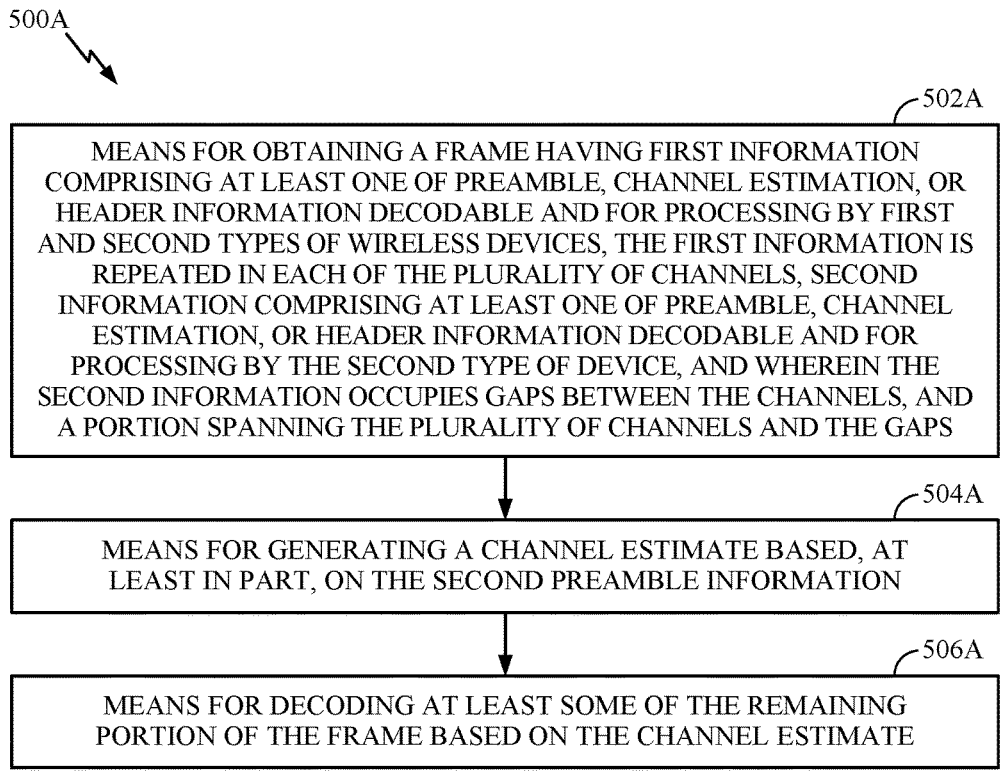
FIG. 5A illustrates example means capable of performing the operations shown in FIG. 5.

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in figures, those operations may have corresponding counterpart means-plus-function components with similar numbering. For example, operations 400 and 500 illustrated in FIGS. 4 and 5 correspond to means 400A and 500A illustrated in FIGS. 4A and 5A. Similarly, operations 800, 900, 1300 and 1400 illustrated in FIGS. 8, 9, 13, and 14 correspond to means 800A, 900A, 1300A and 1400A illustrated in FIGS. 8A, 9A, 13A, and 14A.

For example, means for transmitting (or means for outputting for transmission) may comprise a transmitter (e.g., the transmitter unit 222) and/or an antenna(s) 224 of the access point 110 or the transmitter unit 254 and/or antenna (s) 252 of the user terminal 120 illustrated in FIG. 2. Means for receiving (or means for obtaining) may comprise a receiver (e.g., the receiver unit 222) and/or an antenna(s) 224 of the access point 110 or the receiver unit 254 and/or antenna(s) 254 of the user terminal 120 illustrated in FIG. 2. Means for processing, means for generating, means for decoding, or means for determining, may comprise a processing system, which may include one or more processors, such as the RX data processor 242, the TX data processor 210, the TX spatial processor 220, and/or the controller 230 of the access point 110 or the RX data processor 270, the TX data processor 288, the TX spatial processor 290, and/or the controller 280 of the user terminal 120 illustrated in FIG. 2.

In some cases, rather than actually transmitting a frame a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover a, b, c, a-b, a-c, b-c, and a-b-c.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the wireless node, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. An apparatus for wireless communications, comprising:
    a processing system configured to generate a frame for transmission on at least one channel, the frame having:
        first information for processing by first and second types of devices, and an extended header information intended for processing by only the second type of device that is a targeted recipient of the frame, and
        a data portion, wherein the at least one channel comprises a set of channels assigned to the apparatus, and wherein the data portion is to be transmitted on a bandwidth spanning the set of channels; and
    an interface for outputting the frame for transmission via the at least one channel, wherein:
        the frame further comprises, for each of first and second spatial streams, second information comprising at least one of a training field or channel estimation information for processing by the targeted recipient of the frame; and
        the second information for the first spatial stream is output for transmission with a delay relative to transmission of an end of the first information for the first spatial stream in order to time align the second information for the first spatial stream with the second information for the second spatial stream.

2. The apparatus of claim 1, further comprising a transmitter configured to transmit the frame, wherein the apparatus is configured as an access point.

3. An apparatus for wireless communications, comprising:
    a processing system configured to generate a frame for transmission on at least one channel, the frame having:
        first information comprising at least one of a training field, channel estimation, or header information for processing by first and second types of devices, and extended header information intended for processing by only a second type of device that is a targeted recipient of the frame, and
        a data portion; and
    an interface for outputting the frame for transmission via the at least one channel, wherein:
        the at least one channel comprises a set of channels assigned to the apparatus;
        the set of channels comprises at least first and second contiguous channels;
        the first information is repeated in each of the first and second contiguous channels; and
        the frame further comprises second information comprising at least one of a training field or channel estimation information for processing by the targeted recipient of the frame, wherein the second information is to be output for transmission on bandwidth spanning the at least first and second contiguous channels;
        the first and second contiguous channels are for transmitting at least first and second spatial streams; and
        the first information comprises first information for the first spatial stream repeated in each of the first and second contiguous channels and first information for the second spatial stream repeated in each of the first and second contiguous channels; and
        the first information for the second spatial stream is output for transmission with a delay relative to transmission of the first information for the first spatial stream.

4. The apparatus of claim 3, wherein:
    the second information for the first spatial stream is output for transmission with a delay relative to transmission of an end of the first information for the first spatial stream in order to time align the second information for the first spatial stream with the second information for the second spatial stream.

5. The apparatus of claim 3, further comprising a transmitter configured to transmit the frame, wherein the apparatus is configured as an access point.

6. An apparatus for wireless communications, comprising:

an interface for obtaining a frame transmitted on at least one channel, the frame having:
- first information for processing by first and second types of devices, and an extended header information intended for processing by only the second type of device that is a targeted recipient of the frame, and
- a data portion, wherein the at least one channel comprises a set of channels assigned to the apparatus, and wherein the data portion is obtained on a bandwidth spanning the set of channels; and a processing system configured to process the first information and to decode at least some of the data portion of the frame based on the extended header information, wherein:
- the at least one channel comprises at least a single channel for transmitting at least first and second spatial streams;
- the first information comprises first information for the first spatial stream and first information for the second spatial stream transmitted on the same single channel; and
- reception of the first information for the second spatial stream by the apparatus is delayed relative to transmission of the first information for the first spatial stream.

7. The apparatus of claim 6, further comprising a receiver configured to receive the frame, wherein the apparatus is configured as a wireless station.

8. An apparatus for wireless communications, comprising:
an interface for obtaining a frame transmitted on at least one channel, the frame having:
- first information for processing by first and second types of devices, and header information intended for processing by only a second type of device that is a targeted recipient of the frame, and
- a data portion; and a processing system configured to process the first information and to decode at least some of the data portion of the frame based on the header information, wherein:
- the at least one channel comprises a set of channels assigned to the apparatus;
- the set of channels comprises at least first and second contiguous channels;
- the first information is repeated in each of the first and second contiguous channels;
- the frame further comprises second information comprising at least one of a training field or channel estimation information for processing by the targeted recipient of the frame, wherein the second information is received on bandwidth spanning the at least first and second contiguous channels;
- the first and second contiguous channels are for obtaining at least first and second spatial streams;
- the first information comprises first information for the first spatial stream repeated in each of the first and second contiguous channels and first information for the second spatial stream repeated in each of the first and second contiguous channels; and
- reception of the first information for the second spatial stream by the apparatus is delayed relative to transmission of the first information for the first spatial stream.

9. The apparatus of claim 8, further comprising a receiver configured to receive the frame, wherein the apparatus is configured as a wireless station.

* * * * *